US012737944B2

(12) United States Patent
O'Hara

(10) Patent No.: US 12,737,944 B2
(45) Date of Patent: Sep. 15, 2026

(54) AUTOMATED RELATIONSHIP ANALYSIS AND VISUALIZATION FRAMEWORK

(71) Applicant: SAP IRELAND LIMITED, Dublin (IE)

(72) Inventor: Paul O'Hara, Dublin (IE)

(73) Assignee: SAP IRELAND LIMITED, Dublin (IE)

( * ) Notice: Subject to any disclaimer, the term of this patent is extended or adjusted under 35 U.S.C. 154(b) by 73 days.

(21) Appl. No.: 18/656,796

(22) Filed: May 7, 2024

(65) Prior Publication Data

US 2025/0349049 A1 Nov. 13, 2025

(51) Int. Cl.
*G06T 11/60* (2026.01)
*G06F 40/40* (2020.01)
*G06T 11/26* (2026.01)

(52) U.S. Cl.
CPC .............. *G06T 11/60* (2013.01); *G06F 40/40* (2020.01); *G06T 11/26* (2026.01)

(58) Field of Classification Search
None
See application file for complete search history.

(56) References Cited

U.S. PATENT DOCUMENTS 10,394,875 B2 * 8/2019 Lambert ............... G06F 16/355
11,314,817 B1 * 4/2022 Tory .................. G06F 16/90332
11,874,850 B2 * 1/2024 Prakash ................ G06F 16/904
11,960,500 B1 * 4/2024 Sboychakova ......... G06F 40/20
2020/0134103 A1 * 4/2020 Mankovskii ............ G06F 40/56
2021/0342785 A1 * 11/2021 Mann ...................... G06F 40/18
2021/0344622 A1 * 11/2021 Mann ...................... G06F 40/18
2022/0237228 A1 * 7/2022 Xu ....................... G06F 16/2474
2023/0140938 A1 * 5/2023 Sun ....................... G06F 40/205 715/256
2024/0362405 A1 * 10/2024 Sultanum .............. G06F 40/166
2024/0386058 A1 * 11/2024 Thomas ................ G06F 40/103
2024/0394942 A1 * 11/2024 Shankhdhar .......... G06F 40/211
2025/0094703 A1 * 3/2025 Malak ..................... G06F 40/20
2025/0124308 A1 * 4/2025 Ramani .................. G06N 5/022
2025/0130779 A1 * 4/2025 Nguyen .................... G06F 8/34

FOREIGN PATENT DOCUMENTS

WO WO-2022212045 A1 * 10/2022 ............... G06F 8/20

* cited by examiner

*Primary Examiner* — Hilina K Demeter
(74) *Attorney, Agent, or Firm* — Buckley, Maschoff & Talwalkar LLC

(57) ABSTRACT

Systems and methods include determination of a first feature and a second feature, generation of first prompts to prompt determination of a relationship analysis algorithm based on first feature metadata and second feature metadata and to prompt determination of a function to generate a description of a relationship analysis result, reception of the function from a text generation model in response to the first prompts, execution of the function to generate the description of the relationship analysis result, generation of second prompts to prompt determination of a relationship visualization based on the description and to prompt determination of a second function to generate the relationship visualization incorporating the description, reception of the second function from the text generation model in response to the second prompts, execution of the second function, and presentation of the relationship visualization.

18 Claims, 9 Drawing Sheets

There is a significant relationship between the Churn and Contract variables. This means that the type of contract a customer has can influence whether they churn or not.

AUTOMATED RELATIONSHIP ANALYSIS AND VISUALIZATION FRAMEWORK

BACKGROUND

Today's organizations collect and store large sets of data at an ever-increasing rate. Examples of these large data sets include sensor data and financial data. The Internet of Things has greatly accelerated the deployment of sensors, which has exponentially increased the amount of sensor data generated thereby. The finance industry generates huge quantities of data to facilitate predictions, pattern recognition and strategic planning.

Performing calculations upon or identifying patterns within large sets of data can be time-consuming or even infeasible. Modern data analytics attempts to assist humans in efficiently understanding such data. For example, data mining uses machine learning and/or statistical techniques to discover potentially useful patterns within large sets of data stored in databases, data warehouses, or other information repositories.

Data visualization often complements data mining by representing the output of a data mining analysis in a visual form using elements such as charts, graphs, etc. Data visualizations facilitate the interpretation of trends, relationships, outliers, and patterns discovered by data mining and assist analysis-based decision making. The comprehension provided by a data visualization may be further enhanced by incorporating text which describes the statistical analysis underlying the visualization.

Generation of an effective data visualization therefore requires recognition of a notable relationship within data, quantification of the relationship, determination of a visualization suitable for presenting the quantified relationship, and generation of a textual explanation of the relationship. Satisfying each of these requirements involves significant development efforts, which may be unsuccessful due to the complexity of each requirement and/or require large ongoing maintenance costs.

Systems are desired to efficiently facilitate determination and quantification of relationships within data, and determination and generation of an annotated visualization of the relationships.

DETAILED DESCRIPTION

The following description is provided to enable any person in the art to make and use the described embodiments and sets forth the best mode contemplated for carrying out some embodiments. Various modifications, however, will be readily-apparent to those in the art.

A feature refers to an attribute of a set of data. In the case of tabular data, each table column may be considered as representing a respective feature of the data, while each row is an instance of values of each feature of the data. Many relationship analysis algorithms are available to determine the relationship between selected features, and their suitability depends in part on the underlying feature types. For example, values of a continuous feature consist of numeric data having an infinite number of possible values within a selected range. In contrast, the possible values of a discrete feature are finite. Temperature is an example of a continuous feature, while days of the week and gender are examples of discrete features.

Some embodiments provide a generic framework facilitating automated identification and execution of a suitable relationship analysis algorithm for analyzing the relationship between two features. Moreover, the framework functions to dynamically identify and generate a data visualization suitable for depicting the relationship. The generated data visualization incorporates a description of the result of the relationship analysis, thereby enhancing an organization's ability to identify and understand the relationship between the selected features.

Embodiments may be implemented in a dynamic, cloud-native, low-code environment. Embodiments may reduce the development time for bringing features to production and associated maintenance costs.

Figure 1:
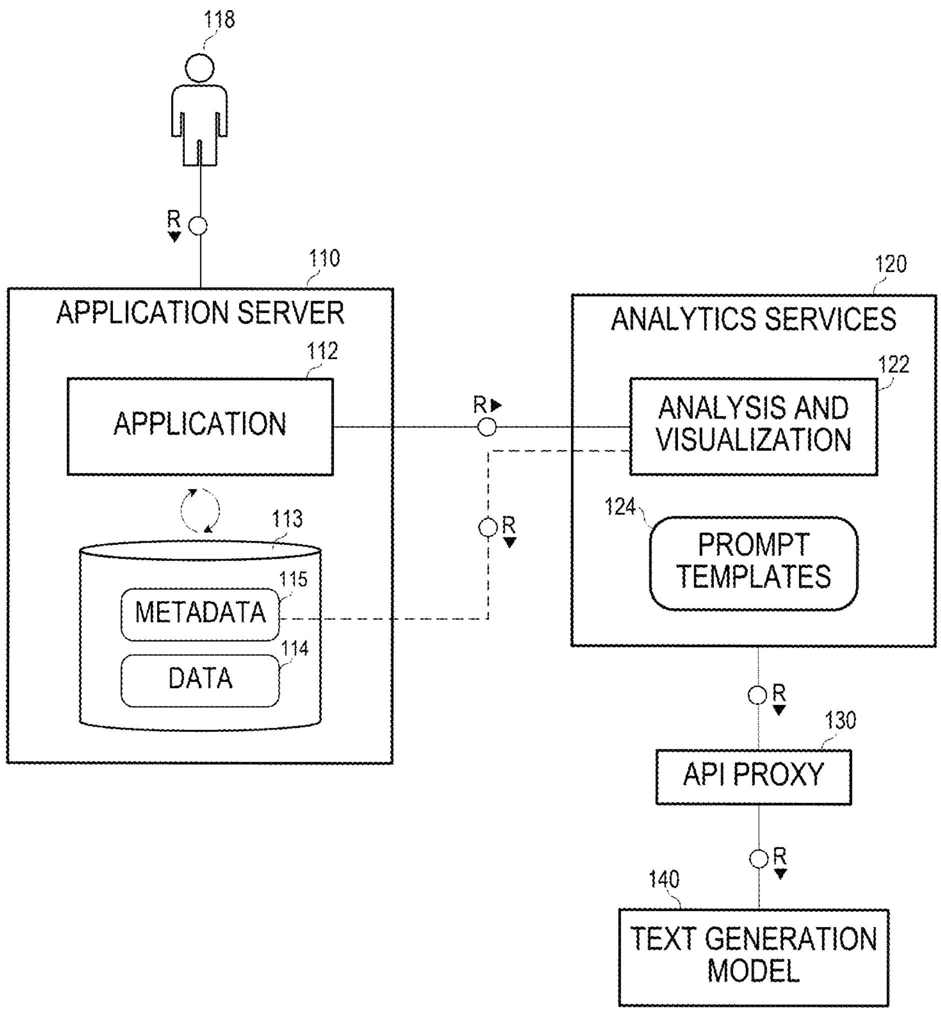
FIG. 1 is a block diagram of an architecture to perform relationship analysis and visualization according to some embodiments.

FIG. 1 is a block diagram of an architecture to perform relationship analysis and visualization according to some embodiments. Each of the illustrated components may be implemented using any suitable combination of on-premise, cloud-based, distributed (e.g., including distributed storage and/or compute nodes) computing hardware and/or software that is or becomes known. Each computing system described herein may comprise one or more physical and/or virtualized servers.

Two or more components of FIG. 1 may be co-located. In some embodiments, two or more components are implemented by a single computing device. One or more components may be implemented as a cloud service (e.g., Software-as-a-Service, Platform-as-a-Service). A cloud-based implementation of any components of FIG. 1 may apportion computing resources elastically according to demand, need, price, and/or any other metric.

Application server 110 may comprise one or more servers, virtual machines, clusters of a container orchestration system, etc. providing an execution platform and services to applications such as application 112. Application server 110 may provide an operating system, services, I/O, storage, libraries, frameworks, etc. to applications executing therein.

Application 112 may comprise program code executable by a processing unit to provide functions to users such as user 118 based on coded logic and on data 114 stored in data store 113. Data 114 may comprise tabular data stored in a columnar or row-based format, object data or any other type of data that is or becomes known. Metadata 115 describes the structure and relationships of data 114 as is known in the art, including but not limited to table schemas. Data store 113 may comprise any suitable storage system such as database system, which may be partially or fully remote from application server 110, and may be distributed as is known in the art.

According to some embodiments, user 118 may interact with application 112 (e.g., via a Web browser executing a front-end UI application associated with application 112) to request relationship analysis of features within a table of data 114. Application 112 may call analytics services 120 in response to this request. The call may include metadata of selected features of a table, as well as values associated with the features in the table.

Analytics services 120 may be implemented by one or more on-premise or cloud-based servers. Analytics services 120 includes program code of analysis and visualization framework 122, which may be executed to perform relationship analysis and visualization as described herein. For example, analysis and visualization framework 122 may generate a system prompt to prompt determination of a relationship analysis algorithm and of a function to execute the relationship analysis algorithm. Framework 122 may determine the system prompt based on one of prompt templates 124.

Framework 122 may also generate a user prompt including the selected features and respective metadata of the selected features. The features and metadata may be received from application 112. In some embodiments, framework 122 requests and receives the metadata directly from application server 110, as indicated by the dashed line of FIG. 1.

The system prompt and the user prompt are then transmitted to Application Programming Interface (API) proxy 130 of trained text generation model 140. Text generation model 140 may comprise a neural network trained to generate text based on input text. Trained text generation model 140 may be implemented by, for example, executable program code, a set of hyperparameters defining a model structure and a set of corresponding weights, or any other representation of an input-to-output mapping which was learned as a result of the training.

According to some embodiments, model 140 is a large language model (LLM) conforming to a transformer architecture. A transformer architecture may include, for example, embedding layers, feedforward layers, recurrent layers, and attention layers. Generally, each layer includes nodes which receive input, change internal state according to that input, and produce output depending on the input and internal state. The output of certain nodes is connected to the input of other nodes to form a directed and weighted graph. The weights as well as the functions that compute the internal states are iteratively modified during training.

An embedding layer creates embeddings from input text, intended to capture the semantic and syntactic meaning of the input text. A feedforward layer is composed of multiple fully-connected layers that transform the embeddings. Some feedforward layers are designed to generate representations of the intent of the text input. A recurrent layer interprets the tokens (e.g., words) of the input text in sequence to capture the relationships between the tokens. Attention layers may employ self-attention mechanisms which are capable of considering different parts of input text and/or the entire context of the input text to generate output text.

Non-exhaustive examples of trained text generation model 140 include GPT-4, LaMDA, Claude or the like. Model 140 may be publicly available or deployed within a landscape which is trusted by a provider of analytics services 120. Similarly, text generation model 140 may be trained based on public and/or private data.

Text generation model 140 generates a response based on the system prompt and the user prompt. The response may include a function to execute a relationship analysis algorithm. According to some embodiments, analysis and visualization framework 122 executes the function. The function may use the values of the selected features stored in data 114. The values may be provided to analysis and visualization framework 122 by application 112 along with the selected features.

According to some embodiments, execution of the function results in generation of a description of a relationship analysis result. Execution of the function generated may also generate a name of the executed relationship analysis (e.g., a Chi-Square Test of Independence) and one or more values of the relationship analysis result.

Next, analysis and visualization framework 122 may generate a system prompt to prompt determination of a visualization and of a function to generate the visualization. In some embodiments, the generated visualization is to include the description of the relationship analysis result. A user prompt is also generated including the metadata of the selected features and the description of the relationship analysis result.

The system prompt and user prompt are transmitted to model 140 via API proxy 130 and a function is received therefrom in response. Framework 122 executes the function to generate a visualization including the description of the relationship analysis result. The visualization is returned to application 112 for presentation to user 118.

Figure 2A:
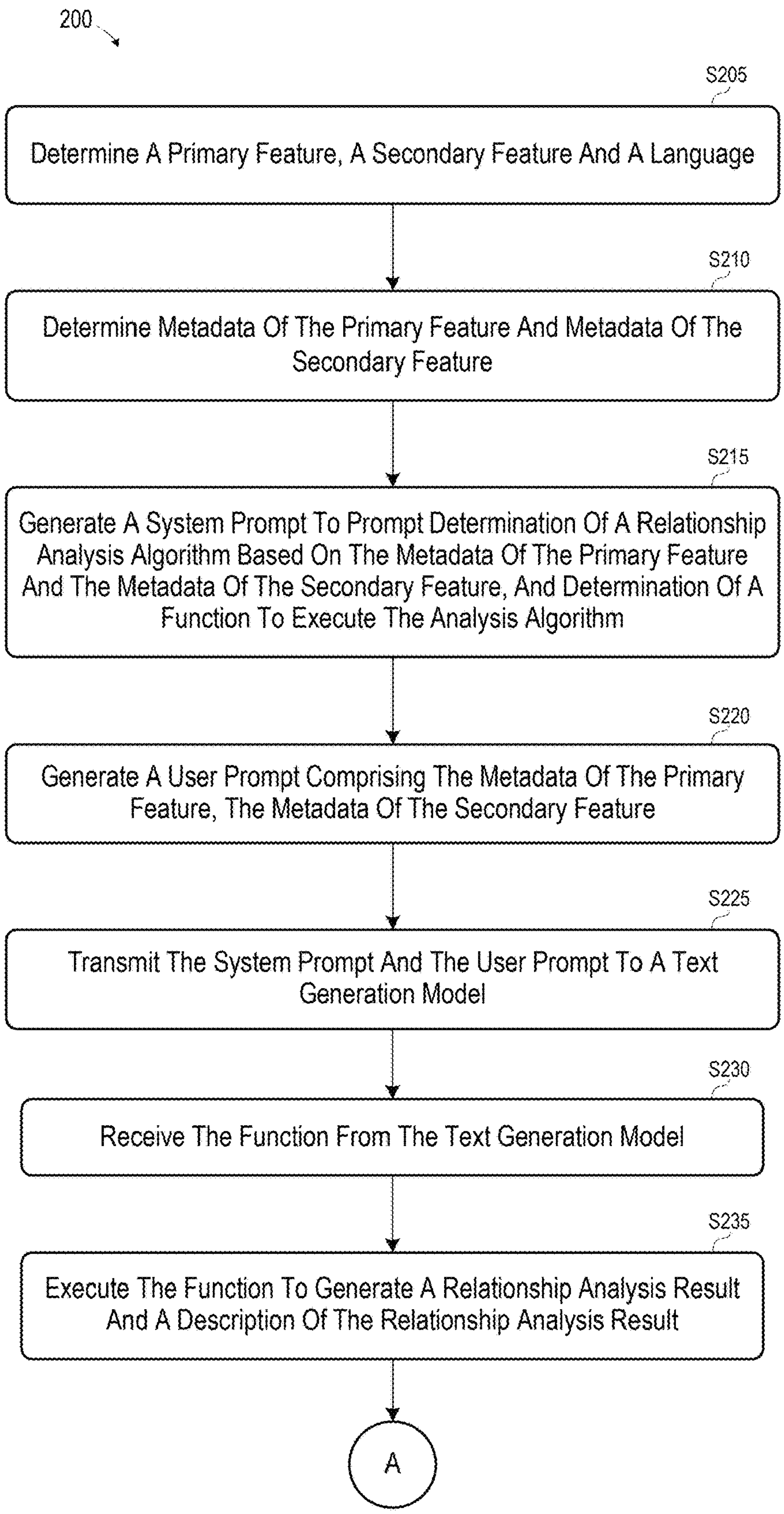
FIGS. 2A and 2B comprise a flow diagram of a process to perform relationship analysis and visualization according to some embodiments.
Figure 2B:
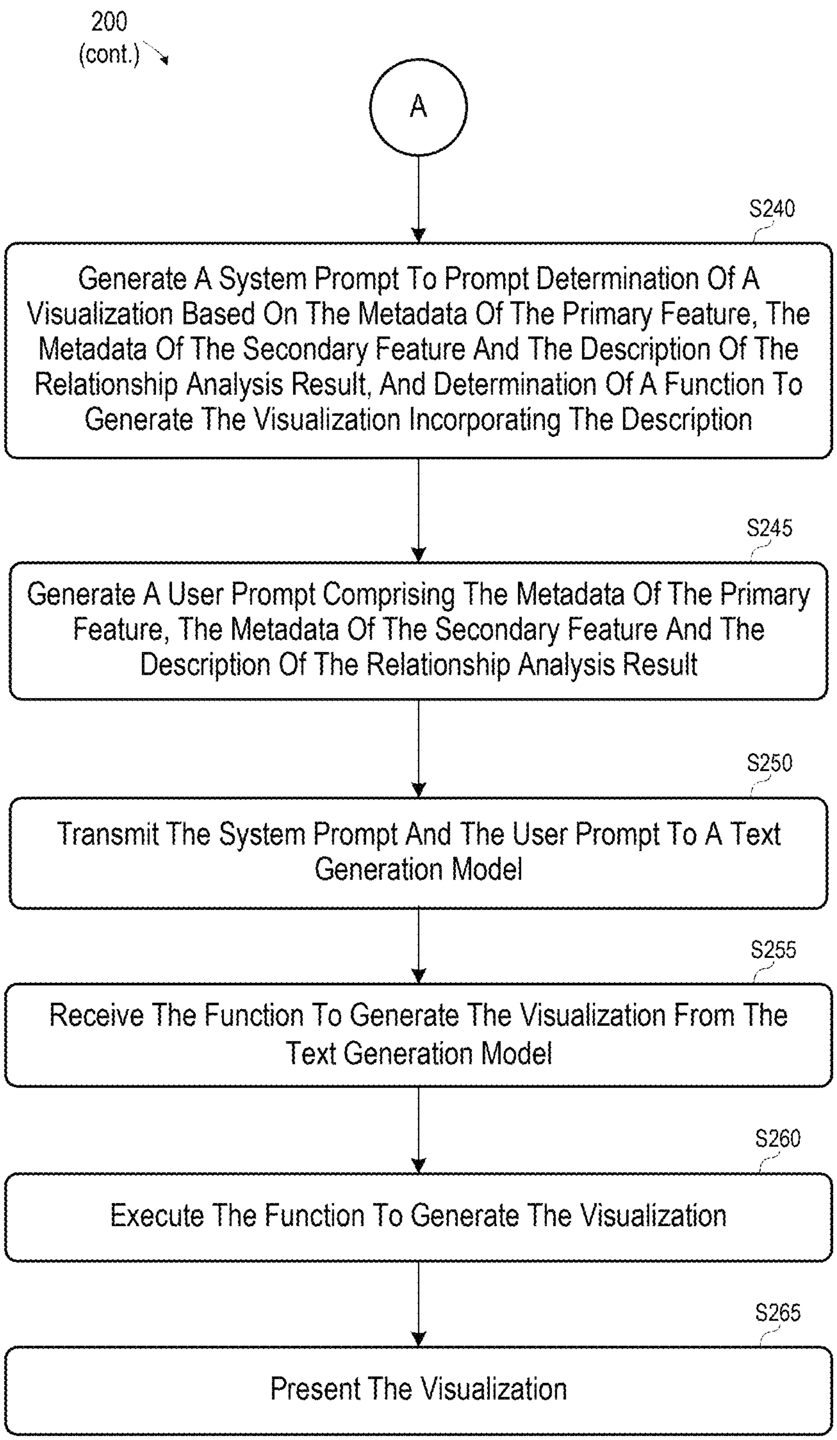

FIGS. 2A and 2B comprise a flow diagram of process 200 to perform relationship analysis and visualization according to some embodiments. Process 200 and the other processes described herein may be performed using any suitable combination of hardware and software. Program code embodying these processes may be stored by any non-transitory tangible medium, including a fixed disk, a volatile or non-volatile random-access memory, a DVD, a Flash drive, or a magnetic tape, and executed by any one or more processing units, including but not limited to a processor, a processor core, and a processor thread. Embodiments are not limited to the examples described below.

Figure 3:
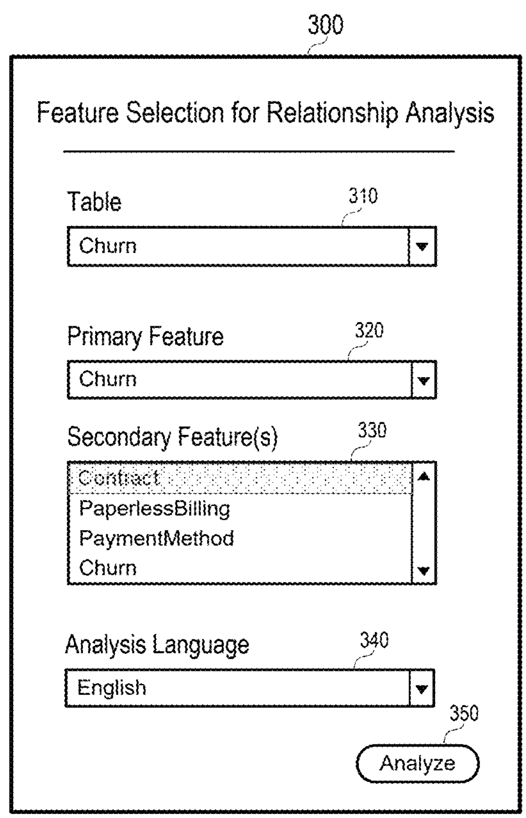
FIG. 3 is a user interface for selecting primary and secondary features for relationship analysis according to some embodiments.

Process 200 may be initiated by user selection of a particular set of data, e.g., a table of transactional data (Sales), or a subset thereof (Sales, EMEA, 2020). A user may, for example, select such data for analysis via a data analytics application. FIG. 3 illustrates user interface 300 of a data analytics application according to some embodiments. In one example, user 118 may execute a Web browser to access application 112 via HyperText Transfer Protocol and receive user interface 300 in return.

User interface 300 includes drop-down field 310 for selecting a table to which the user has access. Selection of a table may result in population of drop-down field 320 with a list of selectable features of the selected table. The user operates field 320 to select a primary feature, and then operates drop-down field 330 to select one or more secondary features. For purposes of the following description, it will be assumed that one secondary feature is determined at S205. Next, according to some embodiments, an analysis language is selected using drop-down field 340. Embodiments are not limited to user interface 300. Embodiments may utilize any interface metaphor for selecting features of a data source.

Process 200 may be initiated upon user selection of Analyze control 350 of interface 300. Accordingly, at S205, the selected primary feature, secondary feature(s) and analysis language are transmitted to and received by a relationship analysis framework. Also transmitted may be metadata of the primary feature and metadata of the secondary feature, which are determined at S210. In some embodiments, the metadata is requested and received at S210 based on the determined features.

A system prompt is generated at S215. The system prompt is intended to prompt determination of a relationship analysis algorithm based on the metadata of the primary feature and the metadata of the secondary feature, and determination of a function to execute the relationship analysis algorithm. The system prompt may be determined based on a pre-existing prompt template.

Next, at S220, a user prompt is generated including the respective metadata of the selected features. The system prompt and the user prompt are transmitted to a trained text generation model at S225. The prompts may be transmitted at S225 using any prompt input protocol supported by the trained text generation model.

Figure 4:
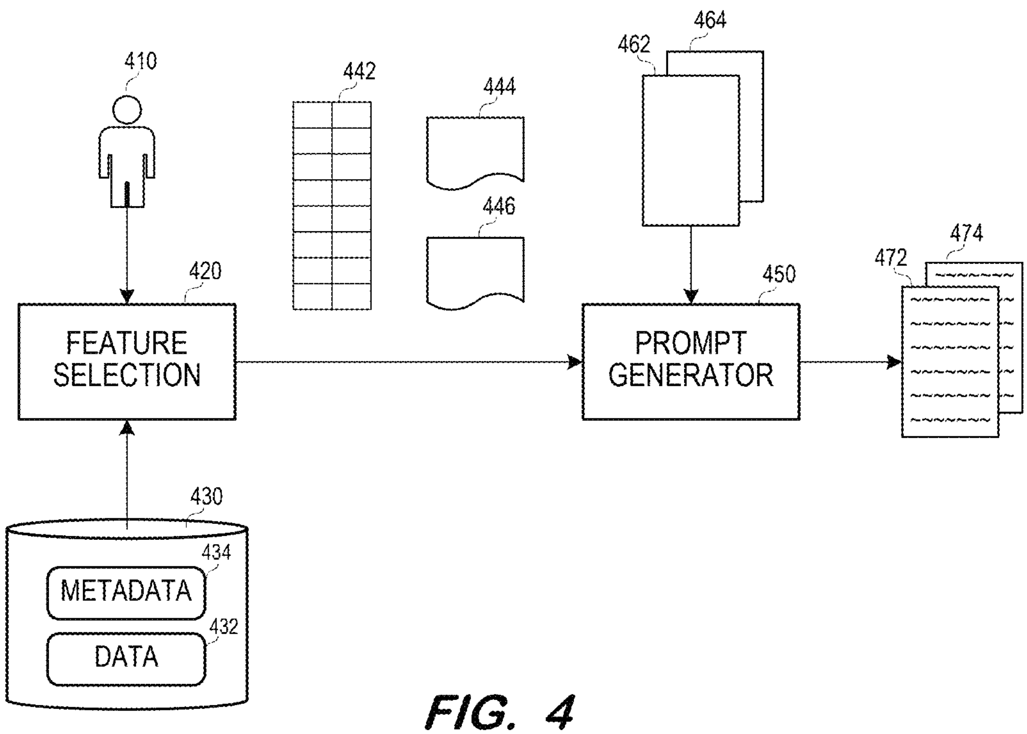
FIG. 4 illustrates generation of prompts to prompt determination of a relationship analysis algorithm and of a function to execute the analysis algorithm according to some embodiments.

FIG. 4 illustrates execution of S205-S225 to generate and transmit prompts according to some embodiments. As illustrated, user 410 interacts with feature selection component 420 to select features of data 432 stored in data store 430. Feature selection component 420 may comprise a component of an application such as application 112 or of analytics services such as services 120.

Feature selection component 420 determines values 442 of the selected features from data 432 and metadata 444 and 446 of each selected feature from metadata 434. Values 442 and metadata 444 and 446 are received by prompt generator 450, which may comprise a component of a relationship analysis and visualization framework as described herein.

Prompt generator 450 may generate relationship analysis metadata based on values 442, metadata 444 and metadata 446. Relationship analysis metadata may include some or all of metadata 444 and metadata 446, as well as metadata determined based on values 442. The relationship analysis metadata may include, for each feature, its name, data type (e.g., float, int, string). The relationship analysis may also include other descriptive statistics depending on the data type and which may be determined based on values 442. For example, it may be determined from values 442 that a selected feature is continuous or categorical. The relationship analysis metadata may be formatted using JavaScript Object Notation (JSON), but embodiments are not limited thereto.

In one example, the selected primary and secondary features are "Churn" and Contract, respectively. Metadata 444 associated with the primary feature Churn may be extracted from metadata 434 as follows:

```
{
 "name":"Churn",
 "data_type":"Categorical",
 "description":"Whether the customer churned
or not (Yes or No)",
 "number_unique":2,
 "categories":[
  "No",
```

-continued

```
  "Yes"
 ]
}
```

Based on metadata 444, additional metadata "Type: Categorical;Binary" may be determined for the primary feature Churn.

Metadata 446 associated with the secondary feature Contract may be extracted from metadata 434 as follows:

```
{
 "name":"Contract",
 "data_type":"Categorical",
 "description":"The contract term of the customer (Month-to-
month, Oneyear, Two year)", "number_unique":3,
 "categories":[
  "Month-to-month",
  "One year",
  "Two year"
 ]
}
```

Additional metadata "Type: Categorical;Multi" may also be determined for the second feature Categories.

Prompt generator 450 may generate system prompt 472 based on system prompt template 462. System prompt 472 may be identical to system prompt template 462 in some embodiments. System prompt template 462 may be one of several system prompt templates available for use by prompt generator 450. Below is an example of system prompt 472 generated at S215 according to some embodiments.

"You are an expert data scientist assistant, skilled in applying complex relationship analysis algorithms and providing explainable interpretations. You will be provided:

two input variables and their data type a language reference, defining the language to output any text in The raw data the analysis is to be performed on, available in memory as a pandas dataframe named localdata Your Role consists of two parts.

Part 1.

Select an algorithm to perform a relationship analysis between the selected input variables. Explain step by step the reasoning for the selected algorithm.

Part 2.

Generate a python function to apply the relationship analysis algorithm, determining the relationship between the selected input variables. The function must output the following:

a. result: The relationship analysis result b. analysis_executed: The name of relationship analysis algorithm applied c. analysis_data: The data passed to the applied relationship analysis algorithm d. interpretation: An interpretation explanation of the relationship analysis result, indicating if a relationship exists between the selected input features, and the degree of the relationship. The textual explanation is to be written in a style understandable to a business user. The textual explanation should include the name of relationship analysis algorithm and be in the specified language.

Example Input ###
Example Input 1 ###
:Input:

-continued

```
Input Variable 1 - Name:Sales, Type:Continuous
Input Variable 2 - Name:Area, Type:Categorical:Multi
Language: English (US)
### Example Input 2 ###
:Input:
Input Variable 1 - Name:Churn, Type:Categorical;Binary
Input Variable 2 - Name:Age, Type:Ordinal
Language: French
### Example Input 3 ###
:Input:
Input Variable 1 - Name:DeliveryOnTime, Type:Categorical;Binary
Input Variable 2 - Name:Item, Type:Categorical;Multi
Language: German
### Example Input 4 ###
:Input:
Input Variable 1 - Name:Weight, Type:Continuous
Input Variable 2 - Name:Total_Speed, Type:Continuous
Language: English (UK)
### Example Output Structure ###
### Example Output Structure 1 ###
## Part 1. ALGORITHM SELECTION AND REASONING ##
[reasoning for selected relationship analysis]
## Part 2. FUNCTION GENERATION ##
"'python [python imports]
def [function_name](localdata):
  [function logic]
  return result, analysis_executed, analysis_data, interpretation"
"'
```

Prompt generator 450 may generate user prompt 474 based on user prompt template 464. User prompt template 464 may be one of several available user prompt templates. An example of user prompt template 464 according to some embodiments is as follows:

Input:

Input Variable <n>

Name: <feature>, <relationship_analysis_metadata>

Input Variable <n+1>

Name: <feature>, <relationship_analysis_metadata>

Language: <language_preference>

The following is a user prompt corresponding to the above-described template and metadata:

Input

Input Variable 1

Name: Churn, Type: Categorical;Binary

Input Variable 2

Name: Contract, Type: Categorical;Multi

Language: English

Prompts 472 and 474 are transmitted to a text generation model at S225. A function to execute a relationship analysis algorithm is received from the text generation model at S230. The function may be formatted as requested by the system prompt. In the above example, the returned function consists of Python code.

With respect to the present example, the following response including the function may be received at S230:

"## ALGORITHM SELECTION AND REASONING ##

Given the two input variables, 'Churn' and 'Contract', both of which are categorical, we can perform a Chi-Square Test of Independence to determine if there is a relationship between them.

The Chi-Square Test of Independence is a statistical test to determine if there is a significant association between two categorical variables. The test is applied when you have two categorical variables from a single population. It is used to determine whether there is a significant association between the two variables.

The steps involved in the Chi-Square Test of Independence are:

1. Formulate the Null Hypothesis (H0) and the Alternative Hypothesis (H1). The Null Hypothesis assumes that there is no association between the two variables. The Alternative Hypothesis assumes that there is an association between the two variables.
2. Construct a Contingency Table from the data. The Contingency Table is a type of table in a matrix format that displays the (multivariate) frequency distribution of the variables.
3. Calculate the Expected Frequencies for each cell in the table. The Expected Frequency is the frequency that we would expect in each cell of the table if the Null Hypothesis is true.
4. Calculate the Chi-Square Statistic. The Chi-Square Statistic is a single number that tells you how much difference exists between your observed counts and the counts you would expect if there were no relationship at all in the population.
5. Compare the Chi-Square Statistic to a Critical Value from the Chi-Square Distribution to determine whether to reject the Null Hypothesis.

```
## PYTHON CODE ##
"'python
import pandas as pd import numpy as np
from scipy.stats import chi2_contingency
  # Preprocessing: Remove any rows with missing values in the 'Churn'
  or 'Contract' columns localdata = localdata.dropna(subset=['Churn',
  'Contract'])
  # Construct a Contingency Table
  contingency_table = pd.crosstab(localdata['Churn'],
  localdata['Contract'])
  # Perform the Chi-Square Test of Independence
  chi2, p, dof, expected = chi2_contingency(contingency_table)
  # Interpret the result
  if p < 0.05:
   interpretation = "There is a significant relationship between 'Churn'
   and 'Contract'."
  else:
   interpretation = "There is no significant relationship between 'Churn'
   and 'Contract'."
  result = {
   'Chi-Square Statistic': chi2,
   'p-value': p,
   'Degrees of Freedom': dof,
   'Expected Frequencies': expected
  }
  type_analysis_executed = "Chi-Square Test of Independence"
  return (result, type_analysis_executed, interpretation)
"'
```

This function first removes any rows with missing values in the 'Churn' or 'Contract' columns. It then constructs a Contingency Table from the data and performs the Chi-Square Test of Independence. The function returns the result of the test, the type of analysis executed, and an interpretation of the result."

Figure 5:
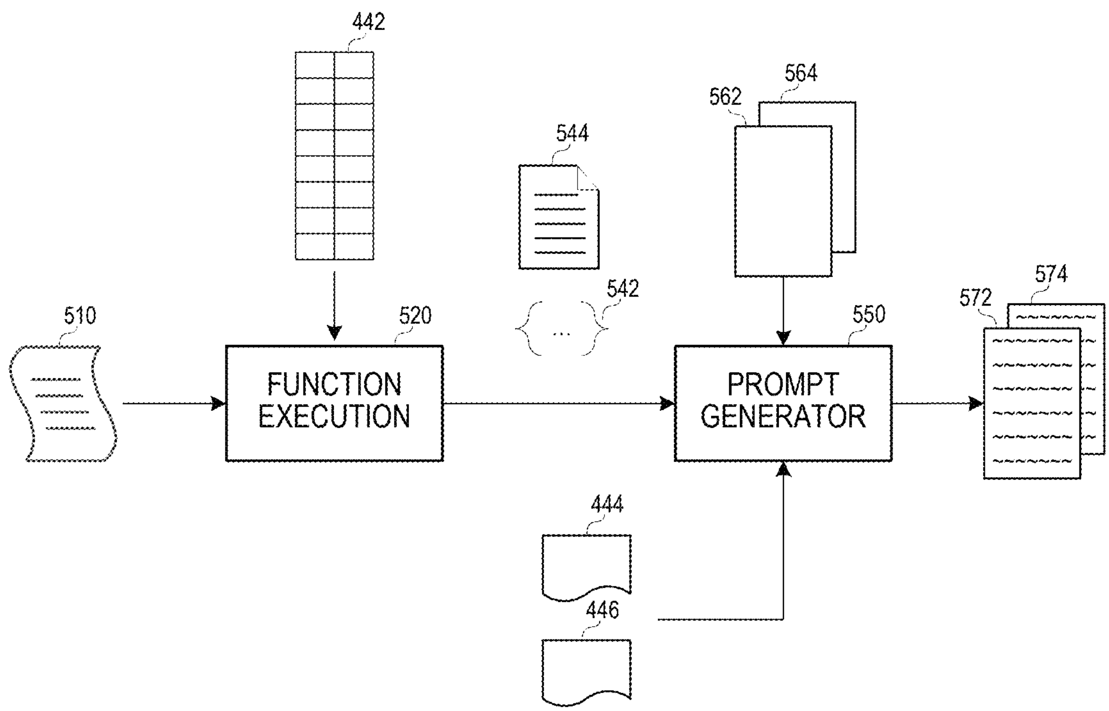
FIG. 5 illustrates execution of an analysis algorithm function and generation of prompts to prompt determination of a visualization and of a function to generate the visualization incorporating a text explanation according to some embodiments.

The received function is executed at S235. According to some embodiments, execution of the function results in generation of a relationship analysis result and a description of the relationship analysis result. Next, at S240, a system prompt is generated to prompt determination of a visualization and of a function to generate the visualization. A user prompt is generated at S245 including the metadata of the selected features and the description of the relationship analysis result. FIG. 5 illustrates execution of S235-S245 according to some embodiments.

Function 510 may comprise a script received from a text generation model at S230. Function execution component 520 (e.g., a component of analytics services 120) executed function 510 in view of values 442 on the selected features.

Execution of the function results in relationship analysis name 542 and description 544 of a relationship analysis result.

Prompt generator 550 may generate system prompt 572 at S240 based on relationship analysis name 542, description 544 and system prompt template 562. System prompt 572 may be identical to system prompt template 562 in some embodiments. System prompt template 562 may be one of several system prompt templates available for use at S240. According to some embodiments, system prompt 572 may be as follows:

You are an expert data scientist, specializing in generating intuitive interpretable data visualizations from complex analysis. You will be provided:

- two input variables and their data type
- the name of a relationship analysis algorithm used to determine if a relationship exists between the two input variables
- an interpretable explanation of the relationship analysis result
- The raw data the relationship analysis was performed on, available in memory as a pandas dataframe named localdata Your Role consists of two parts.

Part 1.

Consider the applied relationship analysis algorithm and data types of both input variables. Now, identify a data visualization (this can contain multiple plots if needed) enabling easy interpretation of any relationship analysis insight(s). Explain your reasoning step by step to be sure you are correct.

Part 2.

generate a python function to create this data visualization, enabling easy interpretation of the relationship analysis result. The function will take as input, the pandas dataframe, localdata, the two input variables passed by the user, the name of a relationship analysis algorithm used, the interpretable explanation. The data visualization must include the provided interpretable explanation text.

The visualization is to be embedded within a webapp, ensure the image generated is byte encoded and contained within an img element.n

Example Input ###

Example Input 1 ###

:Input:

Input Variable 1—Name: MonthlyCharges, Type: Continuous

Input Variable 2—Name: TotalCharges, Type: Continuous

Executed Analysis: Pearson Correlation Coefficient

Analysis Interpretation: Es gibt eine strong positive correlation zwischen den monatlichen Gebühren und den Gesamtgebühren. Ein Pearson-Korrelationskoeffizient von 0.6510648032262035 wurde berechnet, was bedeutet, dass wenn die monatlichen Gebühren steigen, auch die Gesamtgebühren tendenziell steigen.

Example Input 2 ###

:Input:

Input Variable 1—Name: ProductSold, Type: Categorical; Binary

Input Variable 2-Name: Price, Type: Continuous

Executed Analysis: Point-Biserial Correlation Coefficient

Analysis Interpretation: The Point-Biserial Correlation Coefficient indicates a negative relationship between ProductSold and Price. This means that as Price increase, the likelihood of ProductSold decreases.

```
### Example Input 3 ###
:Input:
Input Variable 1 - Name:DeliveryOnTime, Type:Categorical;Binary
Input Variable 2 - Name:Item, Type:Categorical;Multi
Executed Analysis: Chi-Square Test of Independence
Analysis Interpretation: There is a significant relationship between
DeliveryOnTime and Item. This means that the type of Item can
influence the likelihood to DeliveryOnTime
### Example Output Structure ### ### Example Output Structure 1 ###
## Part 1. DATA VISUALISATION SELECTION AND REASONING
##
[reasoning for selected relationship analysis]
## Part 2. FUNCTION GENERATION ##
"'python [python imports]
def [function_name]([function_inputs]):
  [function_logic]
  return [function_result]
"'
```

Prompt generator 550 may generate user prompt 574 at S245 based on user prompt template 564. According to some embodiments, user prompt 574 includes metadata 444 of the primary feature, metadata 446 of the secondary feature and description 544 of the relationship analysis result. An example of user prompt template 564 according to some embodiments is as follows:

:Input:

Input Variable 1-{0}

Input Variable 2-{1}

Executed Analysis: {2}

Analysis Interpretation: {3}

The following is an example of user prompt 574 corresponding to the above-described template and metadata:

Input

Input Variable 1-Name: Churn, Type: Categorical;Binary

Input Variable 2-Name: Contract, Type: Categorical;Multi

Executed Analysis: Chi-Square Test of Independence

Analysis Interpretation: There is a significant relationship between Churn and Contract. This means that the type of contract a customer has can influence their likelihood to churn.

The system prompt and user prompt generated at S240 and S245 are transmitted to the text generation model at S250. At S255, a function to generate a visualization including the description of the relationship analysis result is received from the text generation model. Continuing the above example, the response received at S255 may comprise the following:

"### Part 1. DATA VISUALISATION SELECTION AND REASONING ###

Given that both variables are categorical (one binary and one multi-category), a suitable visualization would be a stacked bar chart. This type of chart allows us to visualize the distribution of the 'Churn' variable (Yes or No) across the different categories of the 'Contract' variable (Month-to-month, One year, Two year).

The height of each bar represents the total number of observations in each category of the 'Contract' variable, and the different colors within each bar represent the proportion of observations in each category of the 'Churn' variable. This way, we can easily compare the churn rates across different contract types.

~~~~
### Part 2. FUNCTION GENERATION ###
‘‘‘python
import matplotlib.pyplot as plt import seaborn as sns
import io
import base64 import urllib
def generate_churn_contract_visualisation(localdata, var1, var2, analysis, interpretation):
  plt.figure(figsize=(10,6))
  sns.countplot(x=var2, hue=var1, data=localdata) plt.title('Churn by Contract Type')
    plt.xlabel('Contract Type')
  plt.ylabel('Count') plt.legend(title='Churn', loc='upper right')
  plt.figtext(0.5, −0.1, interpretation, wrap=True, horizontalalignment='center',
fontsize=12)
  plt.tight_layout( )
  # Save the plot to a BytesIO object
  bytes_image = io.BytesIO( )
  plt.savefig(bytes_image, format='png')
  bytes_image.seek(0)
  # Convert the BytesIO object to a string
  encoded_string = base64.b64encode(bytes_image.read( )).decode('utf-8')
  # Embed the string in an HTML img tag
  img_tag = f'<img src="data:image/png;base64,{encoded_string}" alt="Churn by
Contract Type">'
  return img_tag
‘‘‘
~~~~

This function first creates a stacked bar chart using seaborn's countplot function. It then adds a title, labels for the x and y axes, and a legend. The interpretation of the analysis is added as a text below the plot. The plot is then saved to a BytesIO object, which is converted to a base64-encoded string. This string is embedded in an HTML img tag, which can be directly used in a web app."

Figure 6:
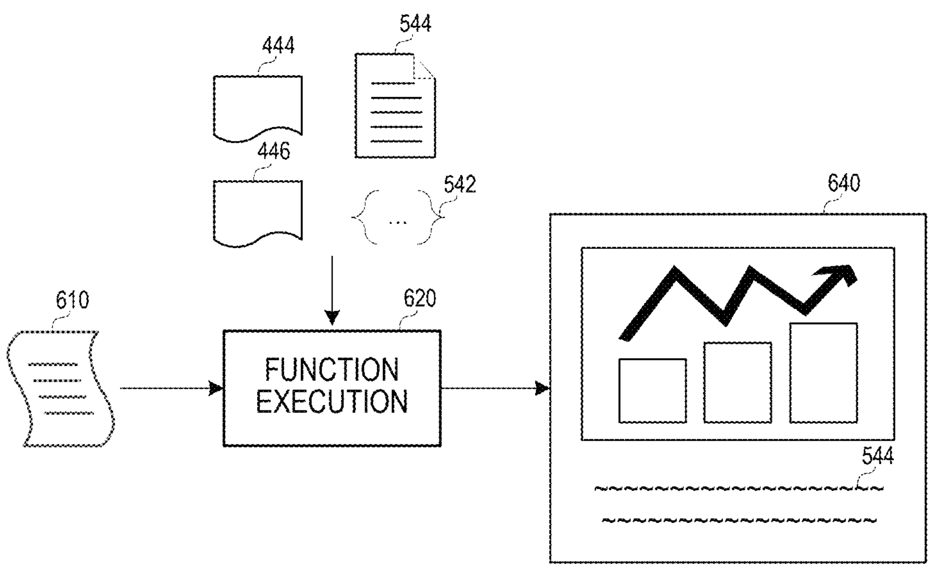
FIG. 6 illustrates execution of a function to generate a visualization incorporating a text explanation according to some embodiments.

The function is executed at S260 to generate the visualization and the visualization is presented to a user at S265. For example, as shown in FIG. 6, function 610, which may comprise a Python script, was received from the text generation model at S255. Values 442 of selected features from data 432 are passed to function 610 along with metadata 444 and 446, name 542 of the relationship analysis, and description 544 of the result of the relationship analysis. In the example above, values 442 are represented by the input variable ‘localdata’.

Execution of function 610 by function execution component 620 results in visualization 640. Visualization 640 may depict a result of the relationship analysis and includes description 544 of the relationship analysis result.

Figure 7:
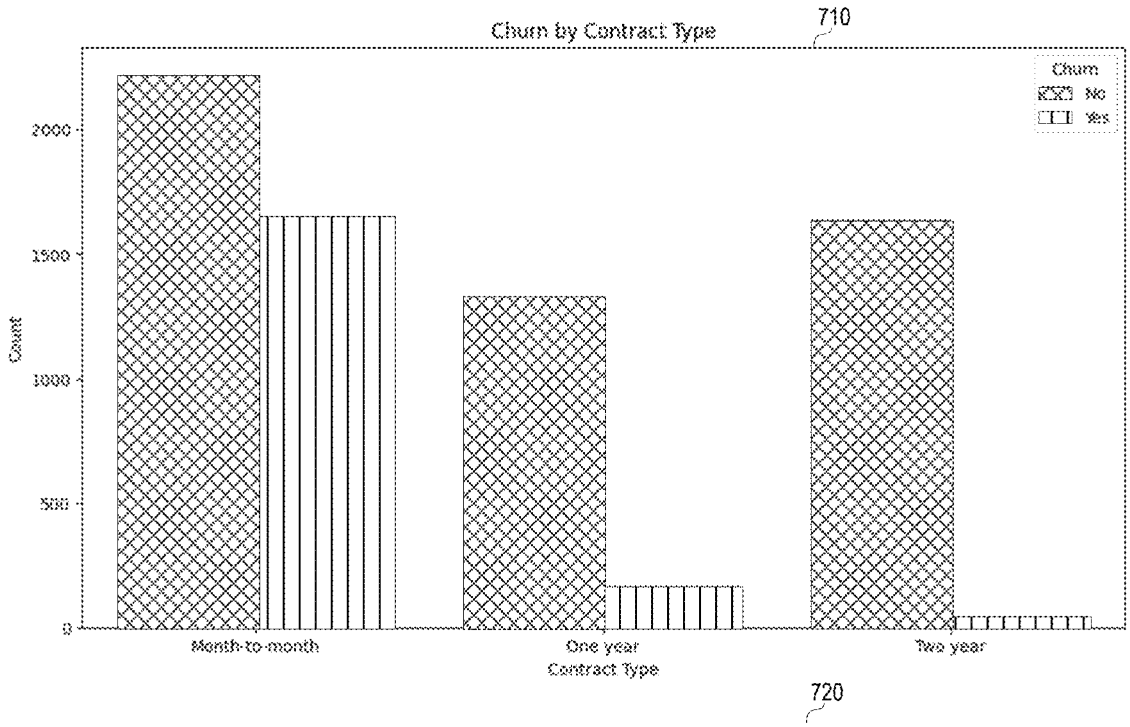
FIG. 7 illustrates a visualization incorporating a text explanation according to some embodiments.

FIG. 7 illustrates visualization 710 generated according to some embodiments. Visualization 710 includes description 720 of a relationship analysis result. Visualization 710 may provide insight into the relationship between the selected features, complemented by description 720 detailing the relationship analysis performed and the strength of the relationship.

Figure 8:
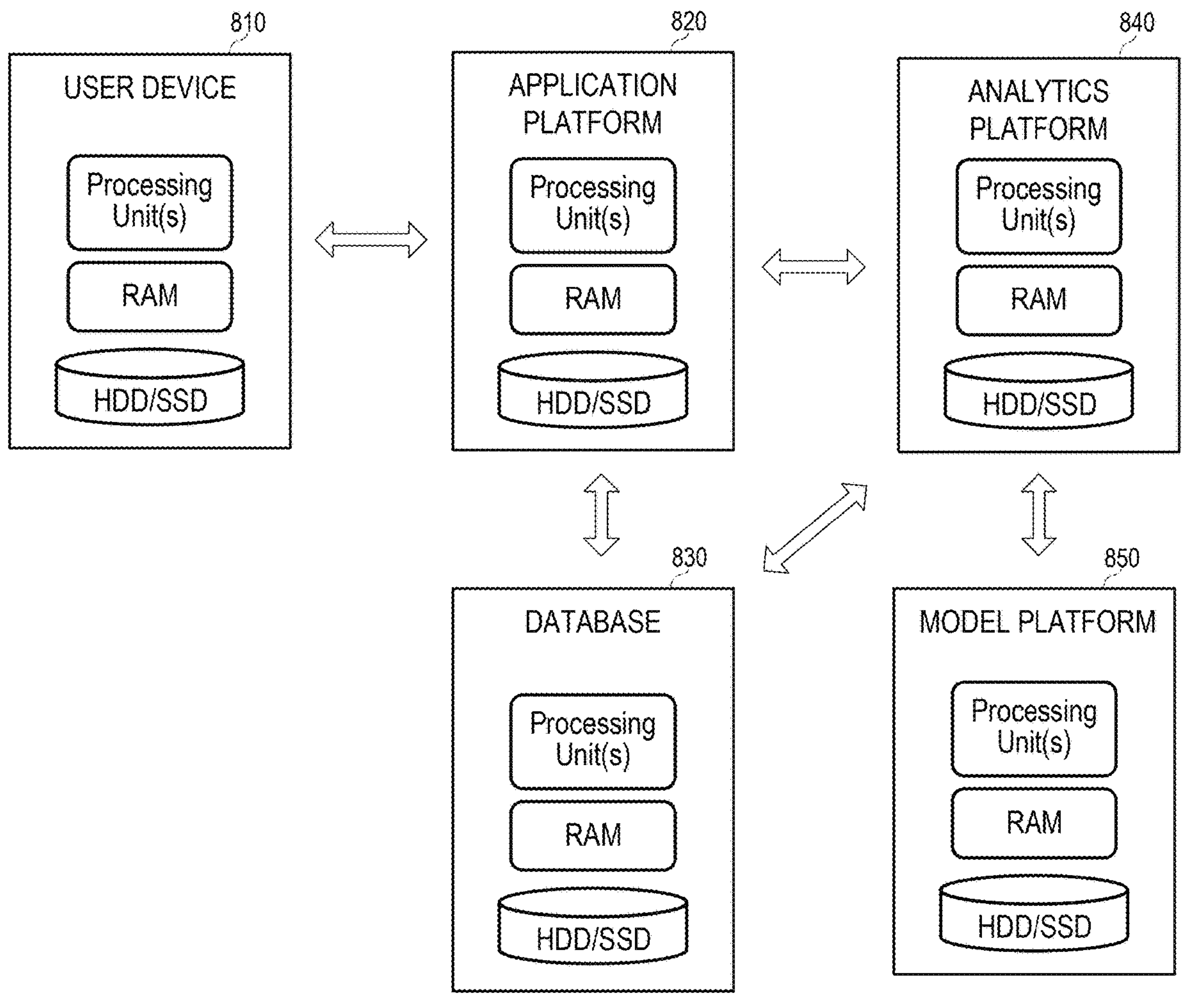
FIG. 8 is a block diagram of a hardware environment providing relationship analysis and visualization according to some embodiments.

FIG. 8 is a block diagram of a cloud-based system according to some embodiments. Application platform 820, database 830, analytics platform 840 and model platform 850 may each comprise cloud-based resources, such as virtual machines, allocated by a cloud provider providing self-service and immediate provisioning, autoscaling, security, compliance, and identity management features.

User device 810 may interact with a user interface of an application executing on application platform 820, for example via a Web browser executing on user device 810. The user interface may receive a request to conduct a relationship analysis of two features of a data source stored by database 830. Application platform 820 may forward the request to an analytics service executing on analytics platform 840, The analytics service may operate as described herein in conjunction with text generation model executing on model platform 850 to generate a visualization of a relationship analysis including a description of a relationship analysis result. The visualization is then returned to user device 810 for display thereon.

The foregoing diagrams represent logical architectures for describing processes according to some embodiments, and actual implementations may include more, or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation some embodiments may include a processing unit to execute program code such that the computing device operates as described herein.

Embodiments described herein are solely for the purpose of illustration. Those in the art will recognize other embodiments may be practiced with modifications and alterations to that described above.

What is claimed is:

1. A system comprising:

a memory storing program code; and one or more processing units to execute the program code to cause the system to:

determine a first feature and a second feature of a data source, the first feature associated with a plurality of first values of the data source and the second feature associated with a plurality of second values of the data source;

determine first metadata of the first feature and second metadata of the second feature;

generate a first one or more prompts to prompt determination of a relationship analysis algorithm based on the first metadata, the second metadata, the plurality of first values and the plurality of second values, and to prompt determination of executable program code to execute the determined relationship analysis algorithm;

transmit the first one or more prompts to a text generation model;

in response to the first one or more prompts, receive the executable program code to execute the relationship analysis algorithm from the text generation model;

execute the executable program code to execute the relationship analysis algorithm and generate a relationship analysis result and a description of the relationship analysis result;

generate a second one or more prompts to prompt determination of a relationship visualization based on the description of the relationship analysis result, the first metadata, the second metadata, the plurality of first values and the plurality of second values, and to prompt determination of second executable program code to generate the relationship visualization incorporating the description of the relationship analysis result;

transmit the second one or more prompts to the text generation model;

in response to the second one or more prompts, receive the second executable program code to generate the relationship visualization from the text generation model;

execute the second executable program code to generate the relationship visualization incorporating the description of the relationship analysis result; and present the relationship visualization incorporating the description of the relationship analysis result.

2. The system according to claim 1, wherein the second executable program code is to generate the relationship visualization incorporating the relationship analysis result and the description of the relationship analysis result.

3. The system according to claim 2, wherein the executable program code is to generate a name of the relationship analysis algorithm, and wherein the second executable program code is to generate the relationship visualization incorporating the name of the relationship analysis algorithm.

4. The system according to claim 1, the one or more processing units to execute the program code to cause the system to:

determine a third feature and a fourth feature of the data source, the third feature associated with a plurality of third values of the data source and the fourth feature associated with a plurality of fourth values of the data source;

determine third metadata of the third feature and fourth metadata of the fourth feature;

determine a system prompt to prompt determination of a second relationship analysis algorithm, and to prompt determination of third executable program code to execute the determined second relationship analysis algorithm;

determine a user prompt including the third metadata and the fourth metadata;

transmit the system prompt and the user prompt to the text generation model;

in response to the system prompt and the user prompt, receive the third executable program code to execute the second relationship analysis algorithm from the text generation model;

execute the third executable program code to execute the second relationship analysis algorithm and generate a second relationship analysis result and a second description of the second relationship analysis result;

generate a second system prompt to prompt determination of a second relationship visualization and to prompt determination of fourth executable program code to generate the second relationship visualization incorporating the second description of the second relationship analysis result;

determine a second user prompt including the second description of the relationship analysis result, the third metadata, and the fourth metadata;

transmit the second system prompt and the second user prompt to the text generation model;

in response to the second system prompt and the second user prompt, receive the fourth executable program code from the text generation model;

execute the fourth executable program code to generate the second relationship visualization incorporating the second description of the second relationship analysis result; and present the second relationship visualization incorporating the second description of the second relationship analysis result.

5. The system according to claim 4, wherein the fourth executable program code is to generate the second relationship visualization incorporating the second relationship analysis result and the second description of the second relationship analysis result.

6. The system according to claim 5, wherein the third executable program code is to generate a second name of the second relationship analysis algorithm, and wherein the fourth executable program code is to generate the second relationship visualization incorporating the second name of the second relationship analysis algorithm.

7. A method comprising:

determining a first feature and a second feature of a data source, the first feature associated with a plurality of first values of the data source and the second feature associated with a plurality of second values of the data source;

determining first metadata of the first feature and second metadata of the second feature;

generating a system prompt to prompt determination of a relationship analysis algorithm and to prompt determination of executable program code to execute the determined relationship analysis algorithm;

generating a user prompt including the first metadata and the second metadata;

transmitting the system prompt and the user prompt to a text generation model;

in response to the system prompt and the user prompt, receiving the executable program code to execute the relationship analysis algorithm from the text generation model;

executing the executable program code to execute the relationship analysis algorithm and generate a relationship analysis result and a description of the relationship analysis result;

generating a second system prompt to prompt determination of a relationship visualization and to prompt determination of second executable program code to generate the relationship visualization incorporating the description of the relationship analysis result;

generating a second user prompt including the description of the relationship analysis result, the first metadata and the second metadata;

transmitting the second system prompt and the second user prompt to the text generation model;

in response to the second system prompt and the second user prompt, receiving the second executable program code to generate the relationship visualization from the text generation model;

executing the second executable program code to generate the relationship visualization incorporating the description of the relationship analysis result; and presenting the relationship visualization incorporating the description of the relationship analysis result.

8. The method according to claim 7, wherein the second executable program code is to generate the relationship visualization incorporating the relationship analysis result and the description of the relationship analysis result.

9. The method according to claim 8, wherein the executable program code is to generate a name of the relationship analysis algorithm, and wherein the second executable program code is to generate the relationship visualization incorporating the name of the relationship analysis algorithm.

10. The method according to claim 7, further comprising:

determining a third feature and a fourth feature of the data source, the third feature associated with a plurality of third values of the data source and the fourth feature associated with a plurality of fourth values of the data source;

determining third metadata of the third feature and fourth metadata of the fourth feature;

determining a third system prompt to prompt determination of a second relationship analysis algorithm, and to prompt determination of third executable program code to execute the determined second relationship analysis algorithm;

determining a third user prompt including the third metadata and the fourth metadata;

transmitting the third system prompt and the third user prompt to the text generation model;

in response to the third system prompt and the third user prompt, receiving the third executable program code to execute the second relationship analysis algorithm from the text generation model;

executing the third executable program code to execute the second relationship analysis algorithm and generate a second relationship analysis result and a second description of the second relationship analysis result;

generating a fourth system prompt to prompt determination of a second relationship visualization and to prompt determination of fourth executable program code to generate the second relationship visualization incorporating the second description of the second relationship analysis result;

determining a fourth user prompt including the second description of the relationship analysis result, the third metadata, and the fourth metadata;

transmitting the fourth system prompt and the fourth user prompt to the text generation model;

in response to the fourth system prompt and the fourth user prompt, receiving the fourth executable program code from the text generation model;

executing the fourth executable program code to generate the second relationship visualization incorporating the second description of the second relationship analysis result; and presenting the second relationship visualization incorporating the second description of the second relationship analysis result.

11. The method according to claim 10, wherein the fourth executable program code is to generate the second relationship visualization incorporating the second relationship analysis result and the second description of the second relationship analysis result.

12. The method according to claim 11, wherein the third executable program code is to generate a second name of the second relationship analysis algorithm, and wherein the fourth executable program code is to generate the second relationship visualization incorporating the second name of the second relationship analysis algorithm.

13. A non-transitory medium storing program code executable by one or more processing units of a computing system to cause the computing system to:

determine a first feature and a second feature of a data source, the first feature associated with a plurality of first values of the data source and the second feature associated with a plurality of second values of the data source;

determine first metadata of the first feature and second metadata of the second feature;

generate a first one or more prompts to prompt determination of a relationship analysis algorithm based on the first metadata, the second metadata, the plurality of first values and the plurality of second values, and to prompt determination of first executable program code to execute the determined relationship analysis algorithm;

transmit the first one or more prompts to a text generation model;

in response to the first one or more prompts, receive the first executable program code to execute the relationship analysis algorithm from the text generation model;

execute the first executable program code to execute the relationship analysis algorithm and generate the relationship analysis result and a description of the relationship analysis result;

generate a second one or more prompts to prompt determination of a relationship visualization based on the description of the relationship analysis result, the first metadata, the second metadata, the plurality of first values and the plurality of second values, and to prompt determination of second executable program code to generate the relationship visualization incorporating the description of the relationship analysis result;

transmit the second one or more prompts to the text generation model;

in response to the second one or more prompts, receive the second executable program code to generate the relationship visualization from the text generation model;

execute the second executable program code to generate the relationship visualization incorporating the description of the relationship analysis result; and present the relationship visualization incorporating the description of the relationship analysis result.

14. The medium according to claim 13, wherein the second executable program code is to generate the relationship visualization incorporating the relationship analysis result and the description of the relationship analysis result.

15. The medium according to claim 14, wherein the first executable program code is to generate a name of the relationship analysis algorithm, and wherein the second executable program code is to generate the relationship visualization incorporating the name of the relationship analysis algorithm.

16. The medium according to claim 13, the one or more processing units to execute the program code to cause the system to:

determine a third feature and a fourth feature of the data source, the third feature associated with a plurality of third values of the data source and the fourth feature associated with a plurality of fourth values of the data source;

determine third metadata of the third feature and fourth metadata of the fourth feature;

determine a system prompt to prompt determination of a second relationship analysis algorithm, and to prompt determination of third executable program code to execute the determined second relationship analysis algorithm;

determine a user prompt including the third metadata and the fourth metadata;

transmit the system prompt and the user prompt to the text generation model;

in response to the system prompt and the user prompt, receive the third executable program code to execute the second relationship analysis algorithm from the text generation model;

execute the third executable program code to execute the second relationship analysis algorithm and generate a second relationship analysis result and a second description of the second relationship analysis result;

generate a second system prompt to prompt determination of a second relationship visualization and to prompt determination of fourth executable program code to generate the second relationship visualization incorporating the second description of the second relationship analysis result;

determine a second user prompt including the second description of the second relationship analysis result, the third metadata, and the fourth metadata;

transmit the second system prompt and the second user prompt to the text generation model;

in response to the second system prompt and the second user prompt, receive the fourth executable program code from the text generation model;

execute the fourth executable program code to generate the second relationship visualization incorporating the second description of the second relationship analysis result; and present the second relationship visualization incorporating the second description of the second relationship analysis result.

17. The medium according to claim 16, wherein the fourth executable program code is to generate the second relationship visualization incorporating the second relationship analysis result and the second description of the second relationship analysis result.

18. The medium according to claim 17, wherein the third executable program code is to generate a second name of the second relationship analysis algorithm, and wherein the fourth executable program code is to generate the second relationship visualization incorporating the second name of the second relationship analysis algorithm.

* * * * *